US005138156A

United States Patent [19]

Lee, III

[11] Patent Number: 5,138,156

[45] Date of Patent: Aug. 11, 1992

[54] VIBRATION TOLERANT INFRARED SENSOR FOR AIRCRAFT

[75] Inventor: John E. Lee, III, Alexandria, Va.

[73] Assignee: The United States of America as represented by the Secretary of the Army, Washington, D.C.

[21] Appl. No.: 500,962

[22] Filed: Mar. 29, 1990

[51] Int. Cl.⁵ ........................ G02B 7/00; F16M 11/12

[52] U.S. Cl. .................................... 250/239; 359/350; 359/894; 248/183

[58] Field of Search ................ 350/1.1, 245, 257, 321, 350/567, 568; 356/51; 248/180, 183, 185; 211/168, 172; 359/350, 429, 430, 894; 33/572, 573, 568; 250/239

[56] References Cited

U.S. PATENT DOCUMENTS

| | | | |
|---|---|---|---|
| 4,103,157 | 7/1978 | Green | 250/239 |
| 4,106,740 | 9/1978 | Lloyd et al. | 248/629 |
| 4,859,847 | 8/1989 | Matsuno et al. | 250/239 |

*Primary Examiner*—Bruce Y. Arnold
*Assistant Examiner*—David R. Parsons
*Attorney, Agent, or Firm*—Milton W. Lee; John E. Holford; Anthony T. Lane

[57] ABSTRACT

An IR detector mounted in a sensor housing is provided to replace an aerial camera boresighted with the guns on an attack helicopter. No modification of the aircraft is required and the sensor housing is uniquely adapted for adjustments in azimuth and elevation and to resist vibration effects on the sensor housing and detector.

4 Claims, 2 Drawing Sheets

VIBRATION TOLERANT INFRARED SENSOR FOR AIRCRAFT

The invention described herein may be manufactured, used, and licensed by the U.S. Government for governmental purposes without the payment of any royalties thereon.

BACKGROUND OF INVENTION

1. Field

The present invention involves a non-imaging target sensor with a single silicon detector element responsive to the visible and more particularly to the near infrared light spectrum. This detector being structured to have a very narrow angle of view. The problem addressed is the substitution of this sensor for an ordinary camera in a high vibration environment.

2. Prior Art

In the U.S. Army's attack helicopter there is an ordinary movie camera mounted in a special support structure. This support structure moves with the helicopter's gun mounts to keep the camera boresighted with the guns. The resulting films are later used to assess the skill of the operator and the effectiveness of the gun sighting mechanism. In warfare it is also used to make damage assessments of specific targets and thereby to aid in strategic decisions. A future aim is to use such recorded information to design automatic target recognition devices and associated systems.

It is proposed that the above detector be mounted in place of the movie camera to obtain certain data which is presently classified and was not needed, nor available to this applicant. This exchange is feasible since the cameras are designed for easy removal from their limited access mounting niches in order to facilitate film loading and unloading. To accomplish this the bottom rear surface of the camera carries a rearward projecting foot structure with a vertical pin that extends downward to engage the camera support structure. Also the front surface of the camera includes a projecting ring structure that surrounds the camera aperture. The ring structure contains an outer circumferential groove that carries an O-ring. The ring fits into a matched opening in the support structure which also has a groove to receive the O-ring in a snap fit. The support structure carries the camera lens in coaxial relation to the matched opening, so that the lens elements, filters, etc. remain in place as the camera is removed. A clamping device on the support structure engages the top of the foot structure to complete the assembly of the camera and support.

Due to the narrow angle of view associated with the detector, this element needs a special mounting means for achieving a very accurate alignment between the optical axis of the detector and the optical axis of the more firmly mounted lens. The mounting means must also be compatible with the camera mounting in the aircraft. If an adjustable system is used, it must be capable of withstanding tremendous vibration stresses and be adapted to provide very small angular adjustments in azimuth, elevation and translation along the optical axis. The controls for these adjustments must also be readily accessible in the cramped environment alloted in the aircraft. The mounting means also includes an electrical coupling wired to the detector so that these elements together form a sensor module. A cable is run from the sensor to the supporting electronics or signal processor which can be placed at any convenient location in the gunship or helicopter. Intelligent signal processors are used to wring out and record every possible detail from the sensors output.

An object of the present invention is, therefore, to provide a replacement sensor module for the camera, which can be quickly emplaced and accurately aligned with the optical axis of the camera support and will maintain this condition under extreme vibration.

SUMMARY

The sensor according to this invention is mounted on an L-shaped base platform which interfaces with an aircraft camera mount. To facilitate alignment with the optical axis of the camera mount, the sensor's detector is mounted in a threaded telescoping focussing tube or housing and the tube is swivel mounted to permit azimuth and elevation adjustments. The latter two adjustments are made with opposed adjusting screws accessible when the L-shaped platform is in the mount and secured with set screws after the adjustments are made.

BRIEF DESCRIPTION OF THE DRAWINGS

The invention is best understood with reference to the accompanying drawings wherein.

DESCRIPTION OF THE PREFERRED EMBODIMENT

Figure 2:
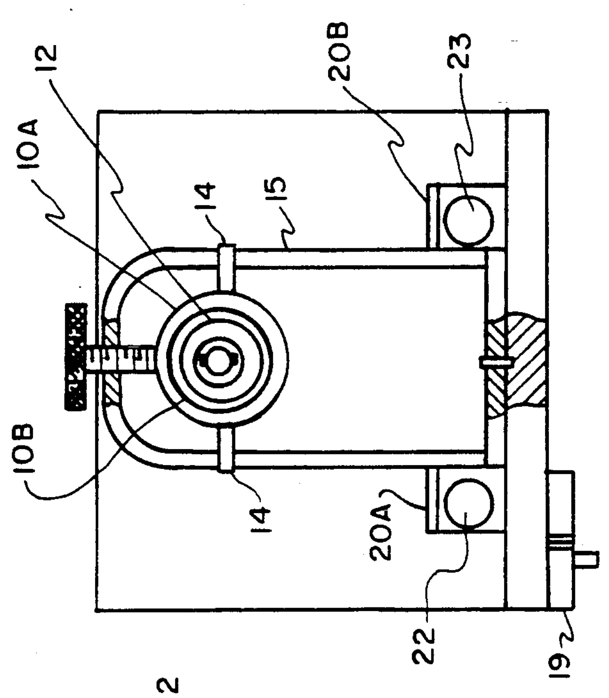
FIG. 2 shows a rear view of the same module.
Figure 1:
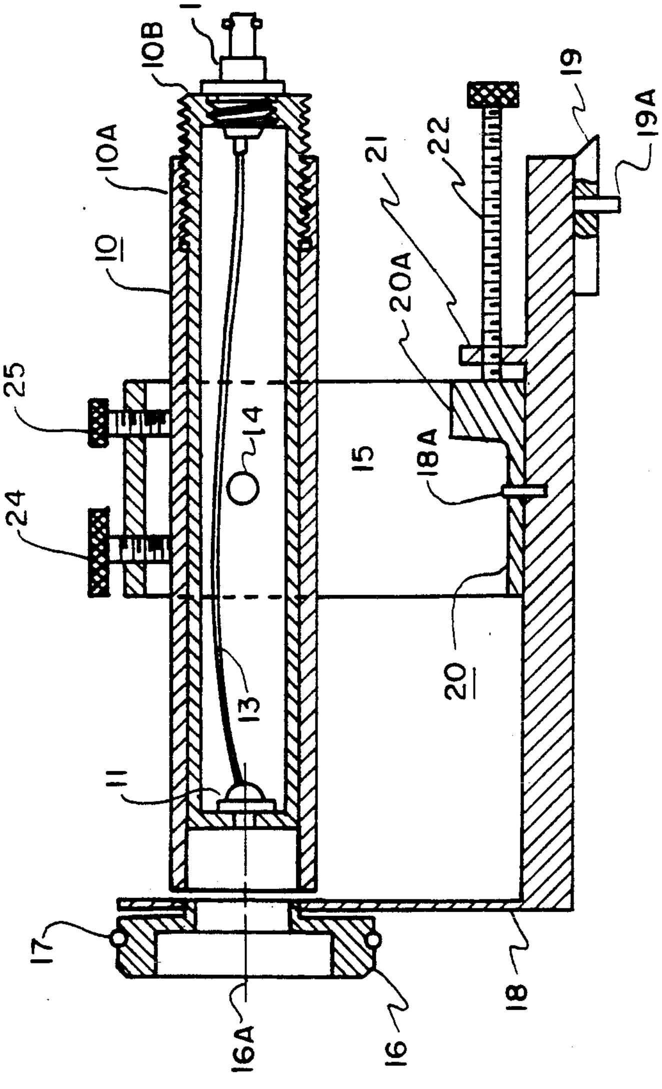
FIG. 1 shows a side view of a first embodiment of the sensor module.

As shown in FIG. 1, the sensor housing 10 consists of two large diameter thick walled tubes 10A and 10B. Tube 10B has apertured transverse circular end walls. The detector 11 is mounted in tube 10B on the front end wall with the photodiode looking out of the aperture of that wall. The aperture in the rear end wall is threaded to receive an appropriate feed through electrical connector 12. A multiwire cable 13 interconnects the sensor and the connector. Tube 10B is dimensioned to slide snugly within tube 10A. Tube 10A contains female threads extending a small fraction of its length from the rear end on its inner surface. These engage with male threads cut into a larger diameter rear portion on tube 10B, of the same extent. Rotating the inner housing tube adjusts the detector to the focal plane of optical system on the aircraft.

The outer housing tube 10A has centrally located radially opposite holes into which dowel pins 14 are seated. The dowel pins act as trunions which extend through the legs of a U-shaped elevation support member 15. Like the housing members it is formed of approximately 3/16 inch thick aluminum. It is bent from a strip of material that is between a quarter and a third as wide as the housing length for proper rigidity. The length of the strip is chosen to substantially align a pivotal point on the axis of the housing 10 with the optical axis of the aircraft's camera mounting structure and to supply sufficient clearance above the sensor housing to permit about a 10° degree elevation adjustment of this housing.

Snap ring 16 is dimensioned to match a snap mount hole in the aircraft's camera mounting structure. The ring axis 16A is substantially aligned with the tube axis and with the optical axis of the optics when the ring is in the fixed support structure. A resilient O-ring 17 of rubber or the like snaps into the groove in the snap ring and engages the groove in the mounting hole in a manner well known in the art. The snap ring is threaded or welded into an aperture in the vertical leg of an angle base member 18, the aperture being about the diameter of the sensor housing. Again this base member is formed of aluminum about ¼ inch thick for rigidity. Alternatively the rigidity of this member may be increased by folding its edges and adding corner filets or ridges at strategic points. The horizontal leg of angle member 18 is fitted with a foot member 19 and a vertical downstanding pin 19A to match this same element on the aircraft camera in size, shape and position.

The U-shaped elevation support member 15 is joined to the horizontal leg of the angle member 18, by means of a rotating joint. The horizontal leg of angle member 18 is provided with an upstanding dowel pin 19 permanently embedded in a hole near the center of its upper face. This engages a free fitting hole in a baseplate 20 welded to the ends of the legs in the U-shaped elevation support. At the corners of the base plate most distant from the upstanding leg of the angle member are two raised bosses 20A and 20B. Facing each of these bosses is an upstanding ear 21, each of which is spaced far enough from the bosses to permit a few degrees rotation of the base plate and tube assembly from its azimuthal alignment position. The center of each ear defines a threaded aperature through which long threaded azimuth adjustment screws 22 and 23 are advanced. These adjustment screws are positioned to achieve the azimuthal alignment position and alternately tightened to regain this position and increase the pressure on the dowel pivot pin 19.

At the apex of the U-shaped elevation support, the support defines two threaded holes with axes normal to the tube axis on either side of the trunion axis. Two elevation adjustment screws 24 and 25 are advanced through these holes to press the tube into elevational alignment with the optical axis of the aircraft mounting structure. These are also alternately tightened to continually restore the elevation alignment condition while increasing pressure on the trunions.

The adjusted structure is highly resistant to vibration as is readily apparent in the signals picked up by the sensor. These adjustments are made quickly and easily. The long bottom screws 22 and 23 facilitate azimuth adjustment in the crowded camera niche. Adjusting elevation with screws 24 and 25 is somewhat more difficult.

Figure 4:
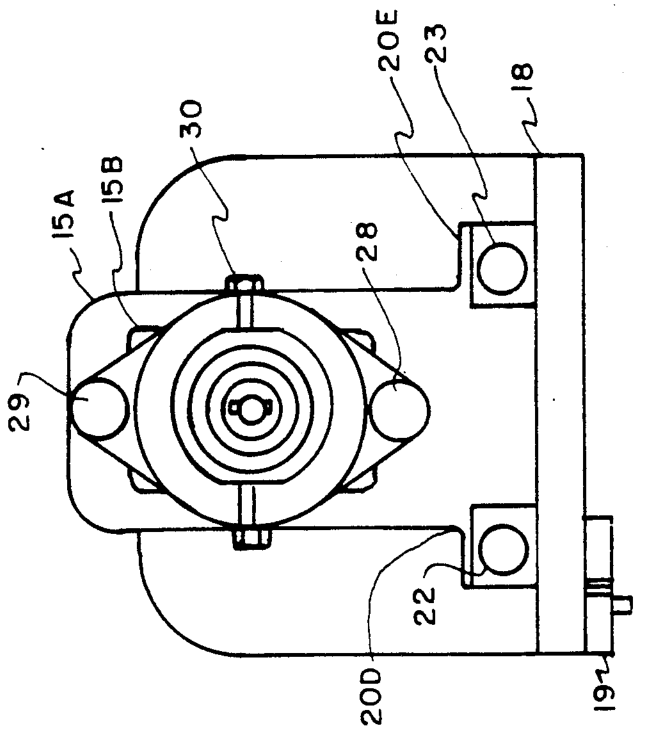
FIG. 4 shows a rear view of the second embodiment.
Figure 3:
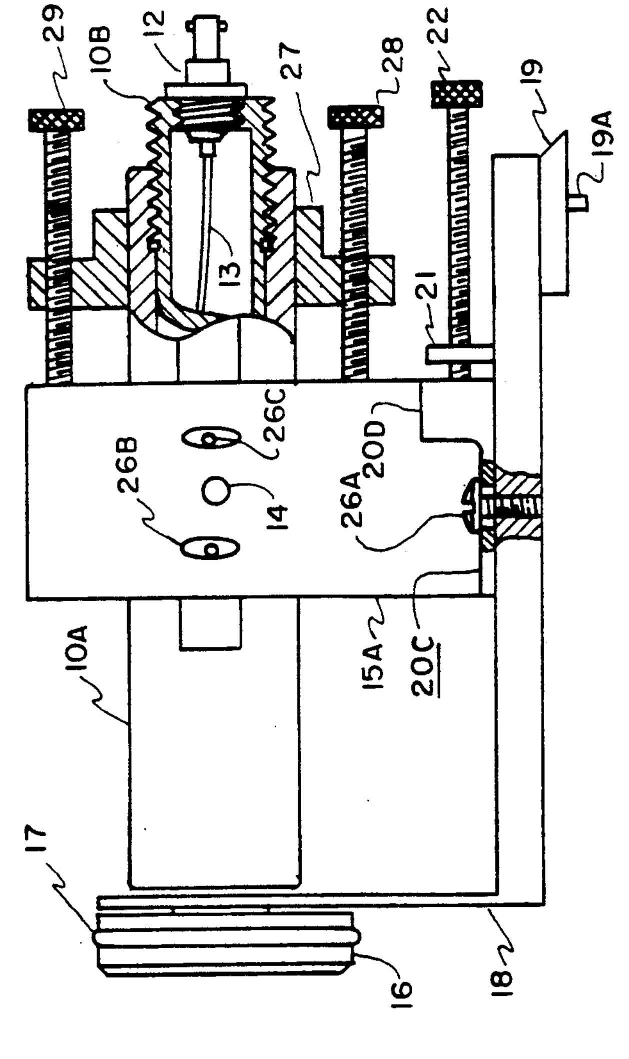
FIG. 3 shows a second embodiment of the sensor module.

FIGS. 3 and 4 show a proposed solution to the elevation adjustment. Instead of a U-shaped support, a one piece yoke 10A is machined from an aluminum block or casting. The yoke is mounted on base plate by means of a dowel pin similar to the FIG. 1 arrangement. The outer tube of the housing 10A is made larger in diameter relative to the width of the opening in the yoke. The sides of tube are ground flat to fit that width. Azimuth and elevation set screws such as 26A are inserted through slots like 26B in the foot of the yoke member and the upper portion of the yoke sides opposite the flat portions of the tubular housing. Threaded holes such as 26C in the base angle member and the housing are provided to receive the screws. The foot of the yoke member has bosses as in FIG. 1 to cooperate with the adjustment screws 22 and 23 in making azimuth adjustments.

Elevation adjustments are provided through a collar 27 which slides over the rear end of the housing and is fixed by retaining screws 30 which are seated in threaded holes on the flat sides of the housing. The collar has an elliptical flange with a long vertical axis almost as tall as the yoke member. Elevation adjustment screws 28 and 29 threaded through the upper and lower edge portions of the flange project normally from the flange toward the rear face of yoke contacting the upper and lower portions of that face. The vertical axis of the flange is sufficiently less than the height of the yoke to permit a few degrees of vertical adjustment of the tubular housing axis.

When the sensor module is first mounted in the aircraft all of the set screws are slightly loose in their slots and the adjusting screws pressed lightly in contact to the approximate center of their angular adjustment ranges. The telescoping housing is adjusted first to place the sensor in the focal plane of the aircraft's optical system. Boresight alignment is then achieved by tightening or loosening the adjustment screws which conveniently project out of the mounting niche as far as practical. Correct azimuthal and elevational alignment is determined electronically with the aircraft positioned in a standard attitude with respect to a standard target. The sensor module is then removed and the set screws tightened to maintain the adjustment. With the set screws tightened the adjustment screws can be retained as an added locking feature or to be convenient for later adjustments. If these adjustment screws constitute an obstruction to aircraft equipment or personnel they are removed and stored in a convenient container. Nylon inserts as used in ordinary lock nuts may be added to any of the screws to further enhance their resistance to vibration.

I claim:

1. A light radiation sensor module to replace a camera removably mounted in an optical support by means of at least two interface members, the support having at least one lens mounted thereon defining an optical axis; the sensor module comprising:

- a thick-walled rigid base structure including interface members substantially identical to those on said camera;
- a telescoping thick-walled tubular housing structure of circular cross-sections with a housing axis passing through the center of said cross-sections with first and second circular end walls having first and second central apertures, respectively;
- a photodiode with a very narrow angle of view mounted in said housing on said first end wall, looking out through said first aperture;
- a feed through electrical connector mounted through said second aperture;
- a multiwire cable in said housing electrically interconnecting said connector and said photodiode;
- a rigid yoke structure interconnecting said base structure and said tubular housing such that a central pivot point on the axis of said housing structure substantially coincides with a point on said optical axis, when said sensor module is mounted in place of said camera;
- said yoke structure including rotating joints that permit azimuth and elevation adjustments of said housing about said pivot point;
- four adjusting screws, each of said screws threaded through one of said base, yoke and housing structures and positioned with one end pressing on another of said base, yoke and housing structures and positioned with one end pressing on another of said structures such that a first pair of said adjusting screws limit clockwise and counterclockwise rotations of said housing structure in azimuth and a separate pair limits like rotations in elevation.

2. A sensor module according to claim 1 further including:

at least one set screw extending through said yoke structure and threaded into said housing structure to lock the elevation of said housing structure.

3. A sensor module according to claim 1, further including:

at least one set screw extending through said yoke and threaded into said base structure to lock the azimuth of said housing structure.

4. A sensor module according to claim 1, wherein:

said adjusting screws are aligned parallel to one another and the axis of said housing such that adjustment ends thereof remote from said one end are located in close proximity to one another and said electrical connector for easy access.

* * * * *